United States Patent
Hu et al.

(10) Patent No.: US 11,146,480 B2
(45) Date of Patent: Oct. 12, 2021

(54) APPARATUS, METHOD OF DETERMINING TRANSMISSION PATH AND COMPUTER-READABLE STORAGE MEDIUM

(71) Applicant: HUAWEI TECHNOLOGIES CO., LTD., Shenzhen (CN)

(72) Inventors: Yongjian Hu, Dongguan (CN); Yinghai He, Shenzhen (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 16/710,037

(22) Filed: Dec. 11, 2019

(65) Prior Publication Data

US 2020/0112501 A1 Apr. 9, 2020

Related U.S. Application Data

(63) Continuation of application No. PCT/CN2018/090751, filed on Jun. 12, 2018.

(30) Foreign Application Priority Data

Jun. 29, 2017 (CN) .......................... 201710514625.3

(51) Int. Cl.
*H04L 12/721* (2013.01)
(52) U.S. Cl.
CPC ............ *H04L 45/123* (2013.01); *H04L 45/72* (2013.01)
(58) Field of Classification Search
CPC combination set(s) only.
See application file for complete search history.

(56) References Cited

U.S. PATENT DOCUMENTS

| | | | |
|---|---|---|---|
| 7,466,701 | B2 | 12/2008 | Mondinelli et al. |
| 7,500,013 | B2 | 3/2009 | Dziong et al. |

(Continued)

FOREIGN PATENT DOCUMENTS

| | | |
|---|---|---|
| CN | 1469260 A | 1/2004 |
| CN | 101778041 A | 7/2010 |

(Continued)

OTHER PUBLICATIONS

C. Filsfils, Ed. et al:'Segment Routing Architecture', Request for Comments: 8402, Jul. 2018, total 32 pages.

(Continued)

*Primary Examiner* — Xavier S Wong
(74) *Attorney, Agent, or Firm* — Hauptman Ham, LLP

(57) ABSTRACT

A method includes determining a transmission path. The method includes determining, by a first node, a first candidate path group that includes at least one first candidate path. when the first candidate path group includes at least two first candidate paths, The method further includes selecting a first path from the at least one first candidate path according to a preset first rule based on node information of each of the first candidate paths in the first candidate path group. The method further includes determining that the first path is a transmission path and when a source node of the first path is the first node, or determining that the second path is the transmission path when the source node of the first path is a second node, where the second path is a reverse path of the first path.

15 Claims, 5 Drawing Sheets

(56) References Cited

U.S. PATENT DOCUMENTS

| | | | |
|---|---|---|---|
| 2003/0233474 A1 | 12/2003 | Yamamoto | |
| 2007/0153707 A1 | 7/2007 | Thubert et al. | |
| 2013/0279371 A1* | 10/2013 | Takashima | H04L 45/38 370/254 |
| 2018/0316599 A1* | 11/2018 | McDonald | H04L 45/121 |

FOREIGN PATENT DOCUMENTS

| | | |
|---|---|---|
| CN | 102223671 A | 10/2011 |
| CN | 102932250 A | 2/2013 |
| CN | 102957574 A | 3/2013 |
| CN | 104092606 A | 10/2014 |
| CN | 104283780 A | 1/2015 |
| CN | 105049355 A | 11/2015 |
| CN | 105471741 A | 4/2016 |
| CN | 106301921 A | 1/2017 |
| CN | 106534220 A | 3/2017 |
| CN | 106603405 A | 4/2017 |
| EP | 2106073 A1 | 9/2009 |
| JP | 2001160825 A | 6/2001 |
| JP | 2009246968 A | 10/2009 |
| JP | 2009290893 A | 12/2009 |
| JP | 2011508555 A | 3/2011 |
| JP | 2012015668 A | 1/2012 |
| JP | 2014154972 A | 8/2014 |
| JP | 2015156589 A | 8/2015 |
| WO | 2010032081 A1 | 3/2010 |

OTHER PUBLICATIONS

C. Filsfils, Ed. et al:"Segment Routing Use Cases draft-filsfils-spring-segment-routing-use-cases-01",Apr. 24, 2015,total 35 pages.
S. Previdi, Ed. et al:"IS-IS Extensions for Segment Routing draft-ietf-isis-segment-routing-extensions-09",Oct. 30, 2016,total 41 pages.
S. Previdi, Ed. et al:"IS-IS Extensions for Segment Routing draft-ietf-isis-segment-routing-extensions-07",Jun. 13, 2016,total 38 pages.
C. Filsfils, Ed. et al:"Segment Routing with MPLS data plane draft-ietf-spring-segment-routing-mpls-09",Jun. 20, 2017,total 11 pages.
International search report dated Sep. 17, 2018 from corresponding application No. PCT/CN2018/090751.
Office Action dated Dec. 4, 2019 from corresponding application No. CN 201710514625.3.
Extended European search report dated Feb. 25, 2020 from corresponding application No. EP 18823404.1.
Japanese Office Action issued in corresponding Japanese Application No. 2019-565859, dated Dec. 7, 2020, pp. 1-5.
Notice of Allowance dated May 8, 2020 from corresponding application No. CN 201710514625.3.

* cited by examiner

APPARATUS, METHOD OF DETERMINING TRANSMISSION PATH AND COMPUTER-READABLE STORAGE MEDIUM

CROSS-REFERENCE TO RELATED APPLICATIONS

This application is a continuation of International Application No. PCT/CN2018/090751, filed on Jun. 12, 2018, which claims priority to Chinese Patent Application No. 201710514625.3, filed on Jun. 29, 2017, the disclosures of which are hereby incorporated by reference in their entireties.

TECHNICAL FIELD

This application relates to the communications field, and in particular, to a transmission path determining method and node.

BACKGROUND

A mobile backhaul transport network is a network between a base station and a base station controller. For example, for second generation wireless technology (2G), a mobile backhaul transport network is a network between a base transceiver station (BTS) and a base station controller (BSC); for third generation wireless technology (3G), a mobile backhaul transport network is a network between a NodeB and a radio network controller (RNC); and for fourth generation wireless technology (4G), a mobile backhaul transport network is a network between an evolved NodeB (eNodeB) and a core network. The mobile backhaul transport network includes a segment router (SR). The segment router mainly serves as a dedicated line access gateway, a multi-protocol label switching virtual private network edge router (MPLS VPN ER), and a multicast service gateway for a very important customer. The segment router uses a path label mechanism to specify a network path through which a packet passes, to form topology information. For example, each segment router allocates a fixed 32-bit label, which is similar to a layer 3 MPLS VPN. Then, the segment router extends and propagates the label and the topology information to an entire network based on a shortest path algorithm according to an interior gateway protocol (IGP) such as a routing protocol (for example, an intermediate system-to-intermediate system (IS-IS) protocol, an open shortest path first (OSPF) protocol, or a border gateway protocol (BGP)), to generate a segment routing tunnel. However, an SR BE tunnel generated by diffusing a label by using the IGP cannot ensure that paths in two opposite directions are strictly a same path. Therefore, how to ensure that paths in two opposite directions between two nodes are a same path is a problem that should be resolved.

SUMMARY

At least one embodiment of the present disclosure provide a transmission path determining method and node, to resolve a problem that transmission paths between nodes are different. Therefore, it is effectively ensured that paths in two opposite directions in an SR tunnel are a same path, thereby ensuring two-way transmission consistency and improving a transmission characteristic of a system.

To achieve the foregoing objective, the following technical solutions are used in the embodiments of the present disclosure:

According to at least one embodiment of the present disclosure includes a transmission path determining method. A first node transmits a packet to a second node along a transmission path. In some embodiments, the method includes: first determining, by the first node, a first candidate path group, where the first candidate path group includes at least one first candidate path, a source node of the first candidate path is the first node or the second node, and a destination node of the first candidate path is the second node when the source node of the first candidate path is the first node, or a destination node of the first candidate path is the first node when the source node of the first candidate path is the second node; then selecting, by the first node, a first path from the at least one first candidate path according to a preset first rule based on node information of all first candidate paths included in the first candidate path group, where the node information includes a node identifier (ID) and an ingress port number (Link) and/or an egress port number of a node connected to the first candidate path; and finally, when a source node of the first path is the first node, determining, by the first node, that the first path is the transmission path; or when a source node of the first path is the second node, determining, by the first node, that a second path is the transmission path, where the second path is a reverse path of the first path. According to at least the transmission path determining method embodiment of the present disclosure, the first node selects the first path from the at least one first candidate path between the first node and the second node; and when the source node of the first path is the first node, determines that the first path is the transmission path; or when the source node of the first path is the second node, determines that the reverse path of the first path is the transmission path, so that the first node determines the transmission path between the first node and the second node. Therefore, in a scenario in which a node determines a transmission path between nodes according to a distributed protocol, a transmission path determined by the second node according to the transmission path determining method provided in at least this embodiment of the present disclosure is the same as the transmission path determined by the first node, thereby effectively resolving a problem that a transmission path from a source node to a destination node is different from a transmission path from the destination node to the source node. Therefore, it is effectively ensured that paths in two opposite directions in an SR tunnel are a same path, thereby ensuring two-way transmission consistency and improving a transmission characteristic of a system. In this way, it is ensured that a latency of transmission from the source node to the destination node is the same as a latency of transmission from the destination node to the source node, so that network operation and maintenance efficiency is improved.

It should be noted that the transmission path described in at least this embodiment of the present disclosure may be an SR tunnel, for example, an SR best-effort (Best-Effort, BE) tunnel, and the transmission path determining method is used for an SR network.

This embodiment of the present disclosure provides two possible implementations in which the first node determines the first candidate path group. Therefore, it is effectively ensured that the paths in the two opposite directions in the SR tunnel are the same path, thereby ensuring the two-way transmission consistency and improving the transmission characteristic of the system, so that the transmission path determined by the second node is the same as the transmission path determined by the first node. In this way, it is ensured that the latency of the transmission from the source node to the destination node is the same as the latency of the transmission from the destination node to the source node, thereby improving the network operation and maintenance efficiency.

With reference to at least one embodiment, the determining, by the first node, a first candidate path group specifically includes: determining, by the first node based on a value of a node ID of the first node and a value of a node ID of the second node, to perform path computation by using the first node or the second node as a source node, to determine the first candidate path group. Therefore, the first node needs to perform path computation by using only the first node or the second node as the source node, to determine the first candidate path group, so that a computation amount of the first node is reduced, an algorithm is simplified, and a time consumed for determining the first candidate path group is relatively short. Alternatively, the first node performs path computation by separately using the first node and the second node as a source node, to obtain the first candidate path group and a second candidate path group, and determines the first candidate path group based on a value of a node ID of the first node and a value of a node ID of the second node, where the second candidate path group includes at least one second candidate path, and when the first candidate path uses the first node as the source node and uses the second node as the destination node, the second candidate path uses the second node as a source node and uses the first node as a destination node, or when the first candidate path uses the second node as the source node and uses the first node as the destination node, the second candidate path uses the first node as a source node and uses the second node as a destination node. Therefore, the first node can determine the first candidate path group from all paths between the first node and the second node.

With reference to at least one embodiment, the preset first rule includes: comparing, node by node from source nodes of the first candidate paths, values of node IDs and/or values of egress/ingress port numbers of any two first candidate paths in the first candidate path group. Therefore, it is effectively ensured that the paths in the two opposite directions in the SR tunnel are the same path, thereby ensuring the two-way transmission consistency and improving the transmission characteristic of the system, so that the transmission path determined by the second node is the same as the transmission path determined by the first node. In this way, it is ensured that the latency of the transmission from the source node to the destination node is the same as the latency of the transmission from the destination node to the source node, thereby improving the network operation and maintenance efficiency.

With reference to at least one embodiment, before the determining, by the first node, that a second path is the transmission path, the method further includes: reversing, by the first node, the first path, to determine the second path. Therefore, it is effectively ensured that the paths in the two opposite directions in the SR tunnel are the same path, thereby ensuring the two-way transmission consistency and improving the transmission characteristic of the system, so that the transmission path determined by the second node is the same as the transmission path determined by the first node. In this way, it is ensured that the latency of the transmission from the source node to the destination node is the same as the latency of the transmission from the destination node to the source node, thereby improving the network operation and maintenance efficiency.

With reference to at least one embodiment, path costs (cost) of all the first candidate paths in the first candidate path group are the same. Therefore, it is effectively ensured that the paths in the two opposite directions in the SR tunnel are the same path, thereby ensuring the two-way transmission consistency and improving the transmission characteristic of the system, so that the transmission path determined by the second node is the same as the transmission path determined by the first node. In this way, it is ensured that the latency of the transmission from the source node to the destination node is the same as the latency of the transmission from the destination node to the source node, thereby improving the network operation and maintenance efficiency. Optionally, the first candidate path is a path with a lowest path cost between the first node and the second node. To be specific, when the first node is the source node, the first candidate path is a path with a lowest path cost in all paths from the first node to the second node; or when the second node is the source node, the first candidate path is a path with a lowest path cost in all paths from the second node to the first node.

According to at least one an embodiment of the present disclosure provides a transmission path determining node. The node serves as a first node. The first node transmits a packet to a second node along a transmission path. The first node includes: a first processor, configured to determine a first candidate path group, where the first candidate path group includes at least one first candidate path, a source node of the first candidate path is the first node or the second node, and a destination node of the first candidate path is the second node when the source node of the first candidate path is the first node, or a destination node of the first candidate path is the first node when the source node of the first candidate path is the second node; a second processor, configured to select a first path from the at least one first candidate path according to a preset first rule based on node information of all first candidate paths included in the first candidate path group, where the node information includes a node ID and an ingress port number and/or an egress port number of a node connected to the first candidate path; and a third processor, configured to: when a source node of the first path is the first node, determine the transmission path based on the first path. When the source node of the first path is the first node, the third processor is specifically configured to determine that the first path is the transmission path. When the source node of the first path is the second node, the third processor is specifically configured to determine that a second path is the transmission path, where the second path is a reverse path of the first path.

It should be noted that, the functional modules in at least one embodiment may be implemented by hardware, or may be implemented by hardware by executing corresponding software. The hardware or the software includes one or more modules corresponding to the foregoing functions. For example, a transceiver is configured to implement functions of a receiver and a transmitter, a processor is configured to implement a function of a processor, and a memory is configured to be used by the processor to process a program instruction indicating the method in the embodiments of the present application. The processor, the transceiver, and the memory are connected and implement mutual communication by using a bus. For details, refer to a function of behavior of the first node in the transmission path determining method according to at least at least one embodiment.

According to at least one embodiment of the present disclosure provides a transmission path determining node. The node serves as a first node. The first node may include at least one processor, a memory, a communications interface, and a communications bus.

The at least one processor is connected to the memory and the communications interface by using the communications bus. The memory is configured to store a computer executable instruction. When the first node runs, the processor executes the computer executable instruction stored in the memory, so that the first node performs the transmission path determining method according to at least one embodiment of the present disclosure.

At least one embodiment of the present disclosure includes a computer storage medium, configured to store a computer software instruction used by the foregoing first node, where the computer software instruction includes a program designed for performing the foregoing transmission path determining method.

In the embodiments of the present application, names of the first node and the second node constitute no limitation on the devices. In at least one embodiment, these devices may have other names, provided that functions of each device are at least similar to those described in the embodiments of the present application and fall within the scope of the claims of the present application and any equivalent technologies.

DETAILED DESCRIPTION

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
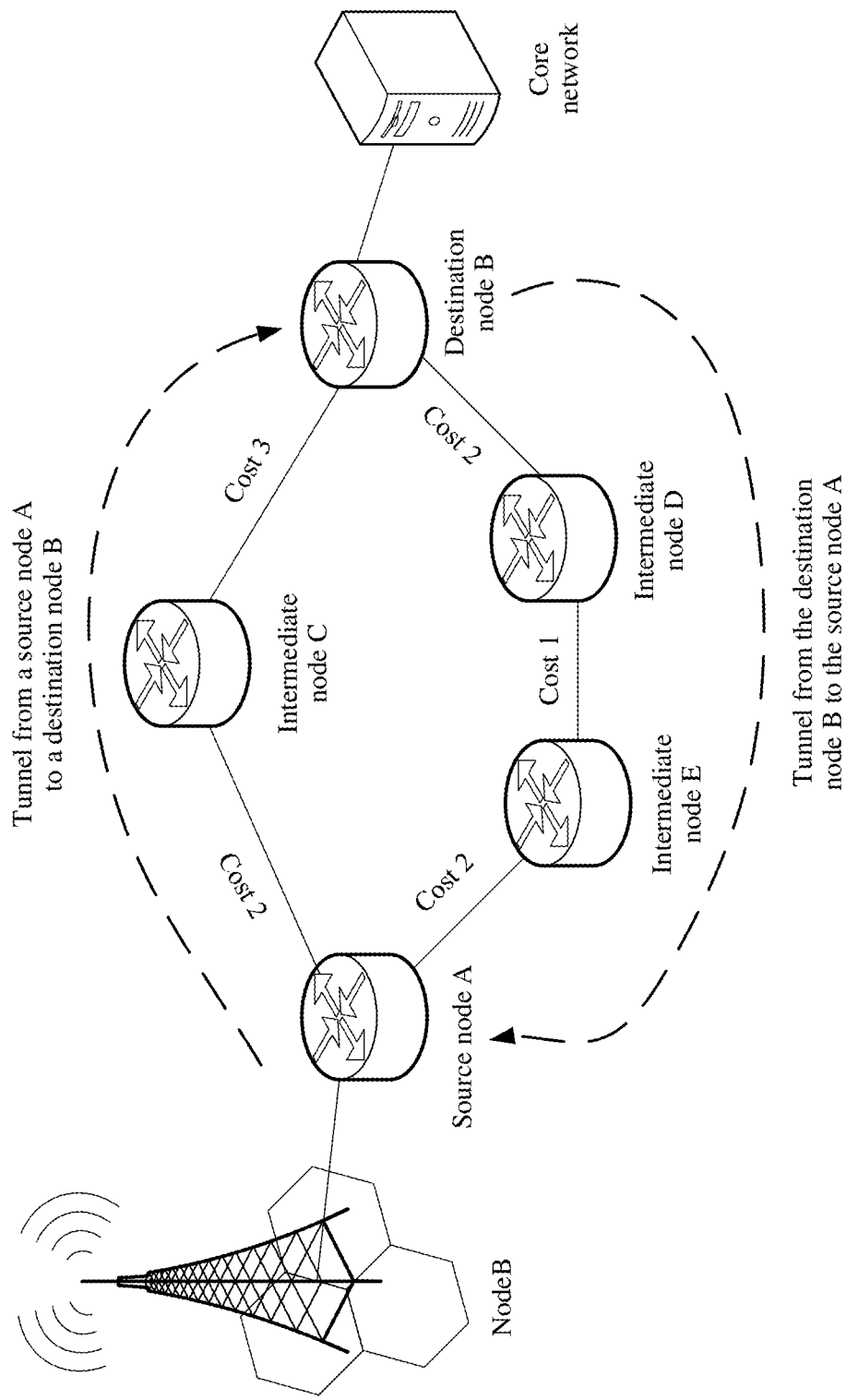
FIG. 1 is a schematic diagram of a network topology.

As shown in FIG. 1, a source node A is obtained through computation based on the shortest path algorithm, a tunnel from the source node A to a destination node B may include be the source node A→ an intermediate node C→ the destination node B, and the destination node B is obtained through computation based on the shortest path algorithm, and a tunnel from the destination node B to the source node A may include be the destination node B→ an intermediate node D→ an intermediate node E→ the source node A. However, to ensure consistency of two-way transmission between two nodes, paths in two opposite directions between the two nodes need to be kept as a same path. Therefore, how to ensure that paths in two opposite directions between two nodes are a same path is an urgent problem that should to be resolved In some embodiments, an IS-IS/OSPF algorithm principle is as follows:

1. Network topology abstraction: An administrator allocates, to each node in a network, a unique node ID, and a port number and a path cost between two nodes connected to each other. For example, for the OSPF algorithm, the node identifier may be a router identifier (Router ID), and the port number may be a neighbor router identifier (RID). For the IS-IS algorithm, the identifier may be a system ID, and the port number may be a label switched path (LSP) ID.

Figure 2:
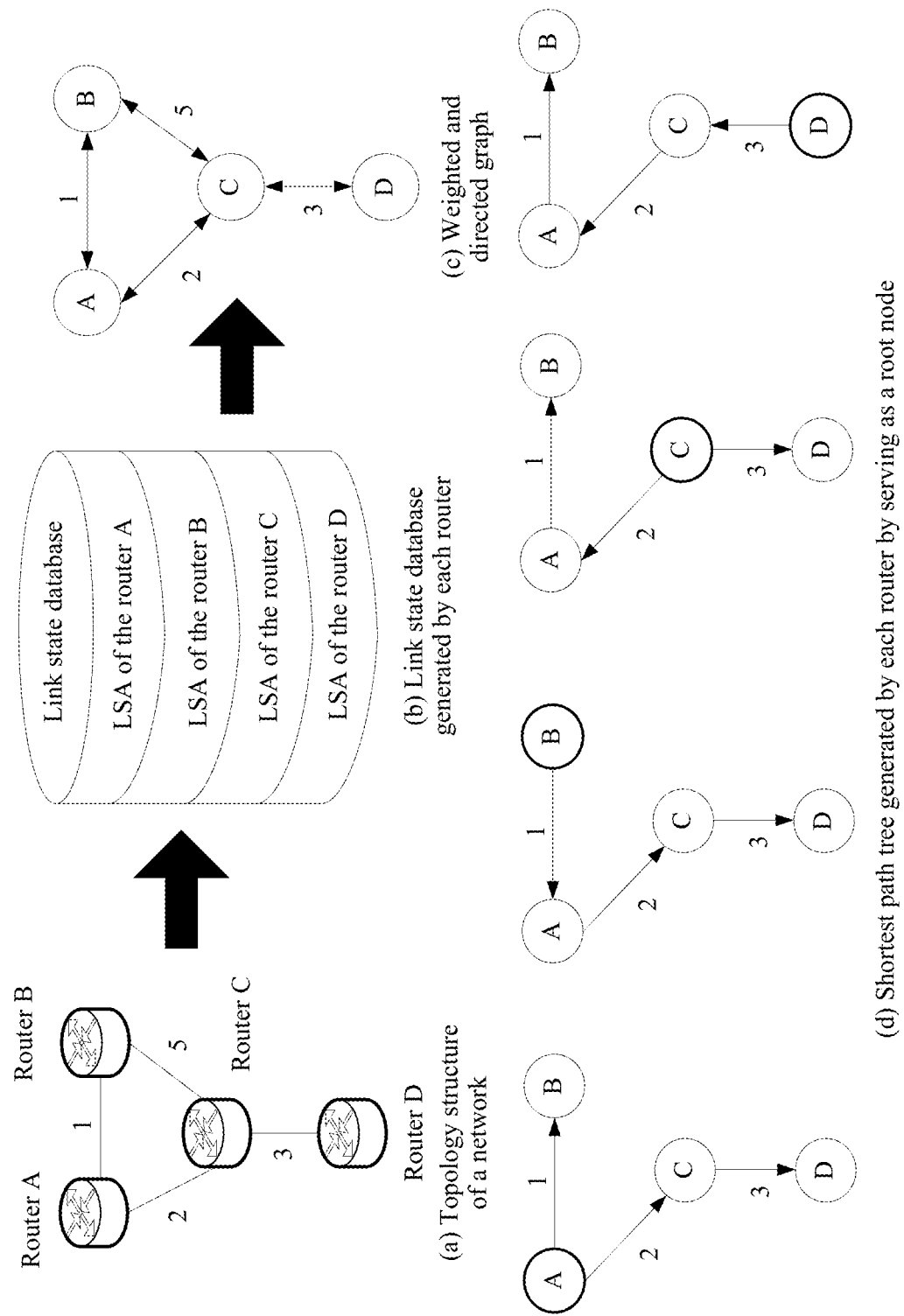
FIG. 2 is a schematic diagram of an IS-IS/OSPF algorithm principle.

FIG. 2 is a schematic diagram of an IS-IS/OSPF algorithm principle of some approaches. Herein, (a) in FIG. 2 shows a topology structure of a network. In an example in which a node is a router, a router A is separately connected to a router B and a router C, the router B is connected to the router C, and the router C is connected to a router D. A path cost between the router A and the router B is 1, a path cost between the router A and the router C is 2, a path cost between the router B and the router C is 5, and a path cost between the router C and the router D is 3.

2. Link state diffusion: Each node diffuses and advertises a node ID, a link state, and a cost of the node to a neighboring node based on a link-state advertisement (LSA) or a link state protocol (LSP) data unit. Each node in the network receives a link state advertised by another node, and collects the link state to generate a link state database (LSDB). Therefore, link state databases of all nodes in the network are consistent. Herein, (b) in FIG. 2 shows a link state database generated by each router.

3. Weighted and directed graph extraction: Each node converts the link state database into a weighted and directed graph. Therefore, directed graphs of all the nodes are exactly the same. Herein, (c) in FIG. 2 shows a weighted and directed graph obtained based on a link state database. The router A may directly transmit a packet to the router B or the router C, or the router A may transmit a packet to the router B through forwarding by the router C. The router A may further transmit a packet to the router D through forwarding by the router C. The router B may directly transmit a packet to the router A or the router C, or the router B may transmit a packet to the router A through forwarding by the router C. The router B may further transmit a packet to the router D through forwarding by the router C. The router C may directly transmit a packet to the router A or the router B, or the router C may transmit a packet to the router A through forwarding by the router B and the router C may transmit a packet to the router B through forwarding by the router A. The router C may further directly transmit a packet to the router D. The router D may directly transmit a packet to the router C. The router D may also transmit a packet to the router B through forwarding by the router C, and the router D may further transmit a packet to the router A through forwarding by the router C. Alternatively, the router D may transmit a packet to the router B through forwarding by the router C and the router A, and the router D may further transmit a packet to the router A through forwarding by the router C and the router B.

4. Minimum spanning tree computation: Each node in the figure computes a shortest path tree by serving as a root node and using a service port function (SPF) algorithm or a shortest path algorithm, obtains a routing table from the node to another node in the network by using the shortest path tree, and stores the routing table. Herein, (d) in FIG. 2 shows a shortest path tree generated by each router by serving as a root node. The router A serves as a root, and obtains a path to the router B, a path to the router C, and a path through the router C to the router D. The router B serves as a root, and obtains a path to the router A, a path through the router A to the router C, and a path through the router A and the router C to the router D. The router C serves as a root, and obtains a path to the router A, a path through the router A to the router B, and a path directly to the router D. The router D serves as a root, and obtains a path to the router C, a path through the router C to the router A, and a path through the router C and the router A to the router B.

Figure 3:
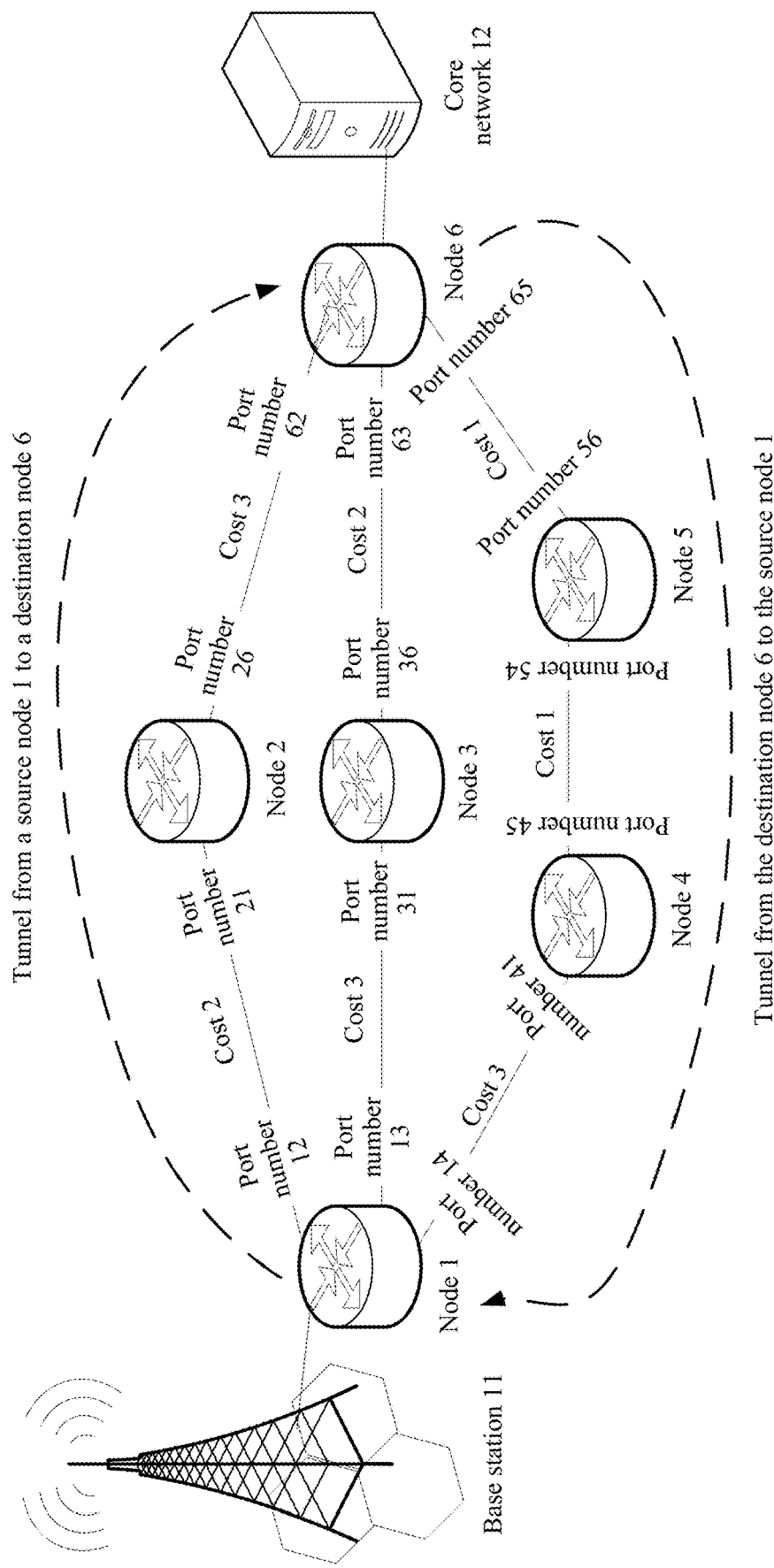
FIG. 3 is a schematic diagram of network topology according to at least one embodiment of the present disclosure.

FIG. 3 is a schematic diagram of a system architecture according to at least one embodiment of the present disclosure. As shown in FIG. 3, the system architecture may include a node 1, a node 2, a node 3, a node 4, a node 5, a node 6, a base station 11, and a core network 12.

The base station 11 is connected to the node 1. The node 1 is separately connected to the node 2, the node 3, and the node 4. The node 4 is connected to the node 5. The node 2, the node 3, and the node 5 are all connected to the node 6. The node 6 is connected to the core network 12.

For example, in some embodiments, at least the node 1, the node 2, the node 3, the node 4, the node 5, or the node 6 may be a router or a switch. In some embodiments, each of the nodes of the present disclosure may be segment routers. In some embodiments, the network of the present disclosure may be an SR network.

Figure 4:
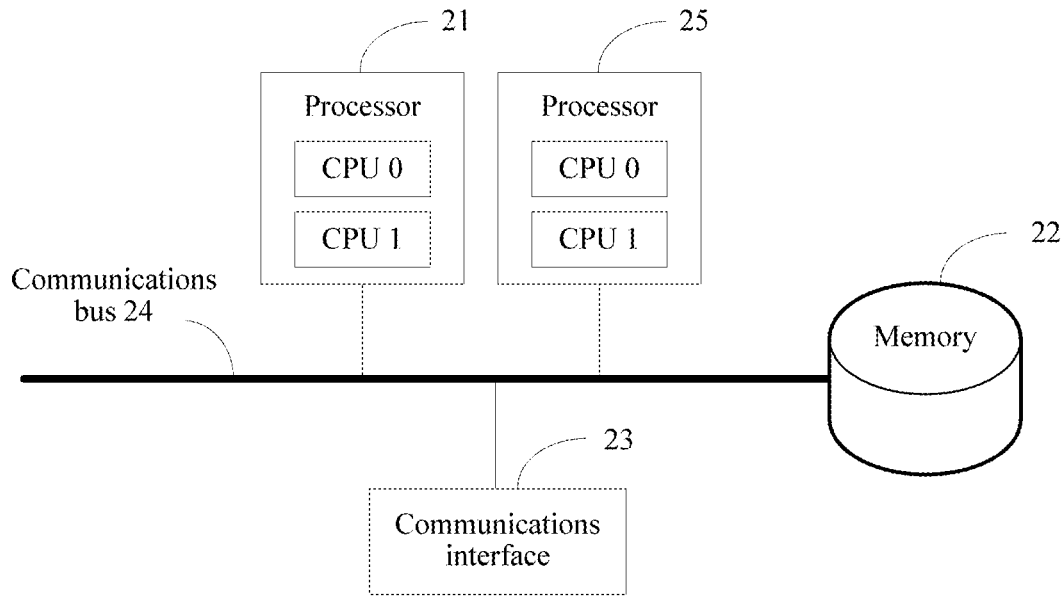
FIG. 4 is a schematic composition diagram of a node according to at least one embodiment of the present disclosure.

FIG. 4 is a schematic composition diagram of a node according to at least one embodiment of the present disclosure. As shown in FIG. 4, the node may include at least one processor 21, a memory 22, a communications interface 23, and a communications bus 24.

The processor 21 is a control center of the node, and may be a processor, or may be a general name of a plurality of processing elements. For example, the processor 21 is a central processing unit (CPU) or an application-specific integrated circuit (ASIC), or may be configured as one or more integrated circuits implementing the embodiments of the present disclosure, for example, one or more digital signal processors (DSPs) or one or more field programmable gate arrays (FPGAs).

The processor 21 may perform various functions of the node by running or executing a software program or instructions stored in the memory 22 and by invoking data stored in the memory 22.

In at least one embodiment, the processor 21 may include one or more CPUs such as a CPU 0 and a CPU 1, as shown in FIG. 4.

In at least one embodiment, the node may include a plurality of processors such as the processor 21 and a processor 25 shown in FIG. 4. Each of these processors may be a single-core processor (single-CPU), or may be a multi-core (multi-CPU) processor. The processor herein may be one or more devices, circuits, and/or processing cores configured to process data (such as a computer program instruction).

The memory 22 may be a read-only memory (ROM) or another type of static storage device capable of storing static information and an instruction, or a random access memory (RAM) or another type of dynamic storage device capable of storing information and an instruction, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can carry or store expected program code in a form of an instruction or a data structure and that is accessible to a computer. The present disclosure is not limited thereto. The memory 22 may exist independently, and is connected to the processor 21 by using the communications bus 24. Alternatively, the memory 22 may be integrated with the processor 21.

The memory 22 is configured to store a software program for executing the solutions in the present disclosure, and the processor 21 controls execution of the software program.

The communications interface 23 is any apparatus such as a transceiver, and is configured to communicate with another device or a communications network such as Ethernet, a radio access network (RAN), or a wireless local area network (WLAN). The communications interface 23 may include a receiver for implementing a receiving function and a transmitter for implementing a sending function.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

A device structure shown in FIG. 4 constitutes no limitation on the node. The node may include more or fewer components than those shown in the figure, or combine some components, or have different component arrangements.

Figure 5:
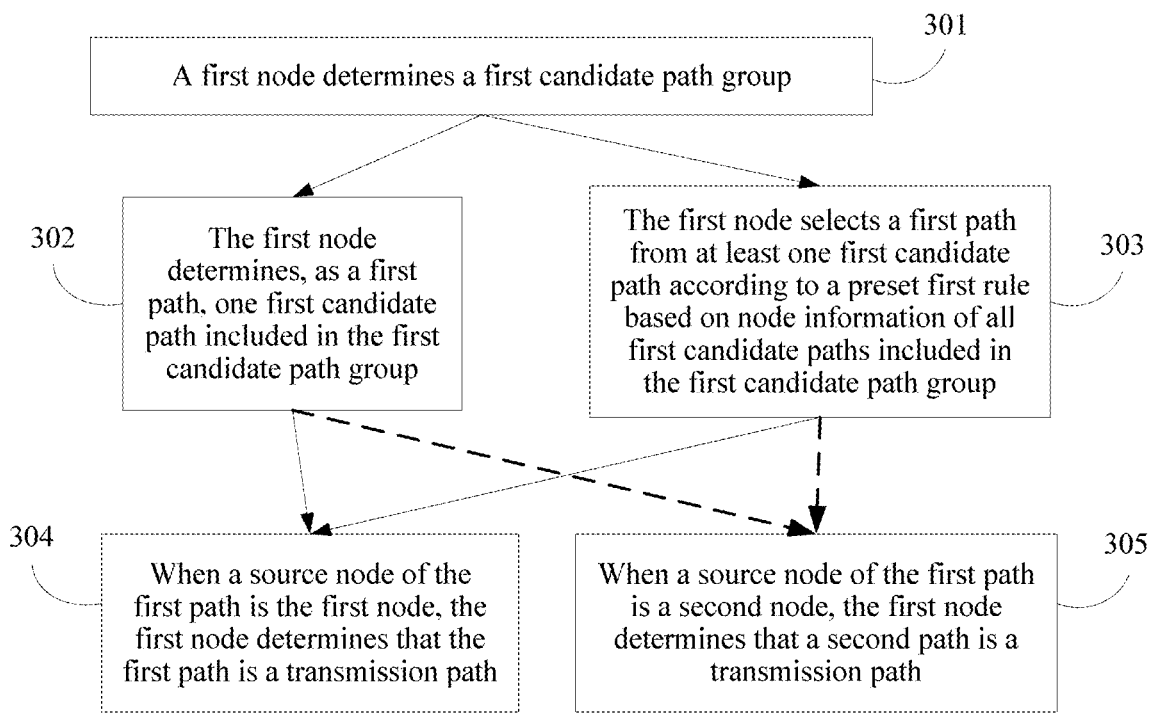
FIG. 5 is a flowchart of a transmission path determining method according to at least one embodiment of the present disclosure.

FIG. 5 is a flowchart of a transmission path determining method according to at least one embodiment of the present disclosure. In at least this embodiment, it is assumed that a first node transmits a packet to a second node along a transmission path. As shown in FIG. 5, the method may include one or more of the following operations.

301. A first node determines a first candidate path group.

The first candidate path group includes at least one first candidate path, a source node of the first candidate path is the first node or the second node, and a destination node of the first candidate path is the second node when the source node of the first candidate path is the first node, or a destination node of the first candidate path is the first node when the source node of the first candidate path is the second node.

For example, the first node may determine the first candidate path group by using the following two determining methods.

In a first determining method, the first node determines, based on a value of a node ID of the first node and a value of a node ID of the second node, to perform path computation by using the first node or the second node as a source node, to determine the first candidate path group. Therefore, the first node performs path computation by using only the first node or the second node as the source node, to determine the first candidate path group, so that a computation amount of the first node is reduced, an algorithm is simplified, and a time consumed for determining the first candidate path group is relatively short.

The first determining method is applied to the system shown in FIG. 3. It is assumed that the first node is the node 1 and the second node is the node 6. The node 1 determines, based on a value of a node ID of the node 1 and a value of a node ID of the node 6, to perform path computation by using the node 1 or the node 6 as a source node, to determine the first candidate path group. For example, the node ID of the node 1 is 1, the node ID of the node 6 is 6, and 1 is less than 6. The node 1 computes a path from the node 1 to the node 6 by using the node 1 as a source node, to determine the first candidate path group. In this case, each of the first candidate paths included in the first candidate path group are paths from the node 1 to the node 6. Alternatively, the node ID of the node 1 is 1, the node ID of the node 6 is 6, and 6 is greater than 1. The node 1 computes a path from the node 6 to the node 1 by using the node 6 as a source node, to determine the first candidate path group. In this case, each of the first candidate paths included in the first candidate path group are paths from the node 6 to the node 1.

In a second determining method, the first node performs path computation by separately using the first node and the second node as a source node to obtain the first candidate path group and a second candidate path group, and determines the first candidate path group based on a value of a node ID of the first node and a value of a node ID of the second node. The second candidate path group includes at least one second candidate path, and when the first candidate path uses the first node as the source node and uses the second node as the destination node, the second candidate path uses the second node as a source node and uses the first node as a destination node, or when the first candidate path uses the second node as the source node and uses the first node as the destination node, the second candidate path uses the first node as a source node and uses the second node as a destination node. Therefore, the first node can determine the first candidate path group from each of the paths between the first node and the second node.

The second determining method is applied to the system shown in FIG. 3. It is assumed that the first node is the node 1 and the second node is the node 6. The node 1 first performs path computation by separately using the node 1 and the node 6 as a source node to obtain the first candidate path group and the second candidate path group, and then determines the first candidate path group based on a value of a node ID of the node 1 and a value of a node ID of the node 6. The second candidate path group includes the at least one second candidate path, and when the first candidate path uses the node 1 as the source node and uses the node 6 as the destination node, the second candidate path uses the node 6 as the source node and uses the node 1 as the destination node, or when the first candidate path uses the node 6 as the source node and uses the node 1 as the destination node, the second candidate path uses the node 1 as the source node and uses the node 6 as the destination node.

It is assumed that the first candidate path uses the node 1 as the source node and uses the node 6 as the destination node, and the second candidate path uses the node 6 as the source node and uses the node 1 as the destination node. In this case, Table 1 is the first candidate path, and Table 2 is the second candidate path.

TABLE 1

| | First candidate path | |
|---|---|---|
| Path number | Path from the node 1 to the node 6 | Path costs |
| 1 | Node 1 → port number 12 → port number 21 → node 2 → port number 26 → port number 62 → node 6 | 5 |

TABLE 1-continued

| | First candidate path | |
|---|---|---|
| Path number | Path from the node 1 to the node 6 | Path costs |
| 2 | Node 1 → port number 13 → port number 31 → node 3 → port number 36 → port number 63 → node 6 | 5 |
| 3 | Node 1 → port number 14 → port number 41 → node 4 → port number 45 → port number 54 → node 5 → port number 56 → port number 65 → node 6 | 5 |

TABLE 2

| | Second candidate path | |
|---|---|---|
| Path number | Path from the node 6 to the node 1 | Path costs |
| 1 | Node 6 → port number 62 → port number 26 → node 2 → port number 21 → port number 12 → node 1 | 5 |
| 2 | Node 6 → port number 63 → port number 36 → node 3 → port number 31 → port number 13 → node 1 | 5 |
| 3 | Node 6 → port number 65 → port number 56 → node 5 → port number 54 → port number 45 → node 4 → port number 41 → port number 14 → node 1 | 5 |

It should be noted that the first determining method used by the first node to determine the first candidate path group is applicable to a case in which a path is effective in both of two opposite directions between the first node and the second node. If there is a path that is effective between the first node and the second node in only a single direction, the first node needs to use the second determining method to determine the first candidate path group. After performing path computation by separately using the first node and the second node as the source node to obtain the first candidate path group and the second candidate path group, the first node reverses each first candidate path in the first candidate path group, compares a node ID and an egress/ingress port number of each reversed first candidate path with a node ID and an egress/ingress port number of each second candidate path in the second candidate path group, and removes the path that is effective between the first node and the second node in only the single direction. Similarly, the first node reverses each second candidate path in the second candidate path group, compares a node ID and an egress/ingress port number of each reversed second candidate path with a node ID and an egress/ingress port number of each first candidate path in the first candidate path group, and removes the path that is effective between the second node and the first node in only the single direction. Then, the first node determines the first candidate path group based on the value of the node ID of the first node and the value of the node ID of the second node. For example, the first candidate path whose path number is 1 in Table 2 is reversed, and a reversed first candidate path is: node 1→port number 12→port number 21→node 2→port number 26→port number 62→node 6, namely, the first candidate path whose path number is 1 in Table 1. In this case, the path whose path number is 1 in Table 1 and the path whose path number is 1 in Table 2 are a path that is effective in both of the two opposite directions between the first node and the second node. Similarly, the path whose path number is 2 in Table 1 and the path whose path number is 2 in Table 2 are a path that is effective in both of the two opposite directions between the first node and the second node. It is assumed that in Table 1, there are only two paths whose path numbers are 1 and 2, and there is no path whose path number is 3. In this case, the first candidate path whose path number is 3 in Table 2 is reversed, but a reversed first candidate path is not found in Table 1. Therefore, the second candidate path whose path number is 3 in Table 2 is removed.

It should be noted that all the first candidate paths included in the first candidate path group determined by the first node according to the first determining method and the second determined method are paths with same costs, and optionally, are paths with lowest costs. A path computation method may be a shortest path algorithm.

Further, after determining the first candidate path group, the first node may further determine a quantity of first candidate paths included in the first candidate path group; and perform operation 302 when the first candidate path group includes one first candidate path, or perform operation 303 when the first candidate path group includes at least two first candidate paths.

302. The first node determines, as a first path, the first candidate path included in the first candidate path group, and performs operation 304 or operation 305.

303. The first node selects a first path from at least one first candidate path according to a preset first rule based on node information of all the first candidate paths included in the first candidate path group, and performs operation 304 or operation 305.

The node information includes a node identifier ID and an ingress port number and/or an egress port number of a node connected to the first candidate path.

The preset first rule is: comparing, node by node from source nodes of the first candidate paths, values of node IDs and/or values of egress/ingress port numbers of any two first candidate paths in the first candidate path group.

The three paths in Table 1 are used as an example. Values of node IDs and values of egress/ingress port numbers of the three paths are compared node by node from sources nodes of the three paths based on node information of the three paths, and the first path is selected from the three paths. Values of node IDs of the source nodes of the three paths are first compared. Because all the source nodes of the three paths are the node 1, all the node IDs are the same and are 1. Then, egress port numbers of the node 1 on the three paths are compared according to a node-by-node comparison rule. It is assumed that a smaller port number is selected. Because a link 13 is smaller than a link 14, and a link 12 is smaller than a link 13, the node 1 selects, as the first path, the path whose path number is 1, namely, the path from the node 1 through the node 2 to the node 6. If a larger port number is to be selected, the node 1 selects, as the first path, the path whose path number is 3, namely, the path from the node 1 through the node 4 and the node 5 to the node 6.

304. When a source node of the first path is the first node, the first node determines that the first path is the transmission path.

305. When a source node of the first path is the second node, the first node determines that a second path is the transmission path.

The second path is a reverse path of the first path. The first node reverses the first path, to determine the second path. The path whose path number is 1 in Table 1 and the path whose path number is 1 in Table 2 are used as an example for description. It is assumed that the first path is the path whose path number is 1 in Table 2, namely, node 6→port number 62→node 26→node 2→port number 21→port number 12→node 1, and the second path is the path whose path number is 1 in Table 1, namely, node 1→port number 12→port number 21→node 2→port number 26→port number 62→node 6. The node 1 reverses the path whose path number is 1 in Table 2, to obtain the path whose path number is 1 in Table 1.

According to the transmission path determining method provided in this embodiment of the present disclosure, the first node selects the first path from the at least one first candidate path between the first node and the second node; and when the source node of the first path is the first node, determines that the first path is the transmission path; or when the source node of the first path is the second node, determines that the reverse path of the first path is the transmission path, so that the first node determines the transmission path between the first node and the second node. Therefore, in a scenario in which a node determines a transmission path between nodes according to a distributed protocol, a transmission path determined by the second node according to the transmission path determining method provided in this embodiment of the present disclosure is the same as the transmission path determined by the first node, thereby effectively resolving a problem that a transmission path from a source node to a destination node is different from a transmission path from the destination node to the source node. Therefore, it is effectively ensured that paths in two opposite directions in an SR tunnel are a same path, thereby ensuring two-way transmission consistency and improving a transmission characteristic of a system. In this way, it is ensured that a latency of transmission from the source node to the destination node is the same as a latency of transmission from the destination node to the source node, so that network operation and maintenance efficiency is improved.

The foregoing mainly describes the solutions provided in the embodiments of the present disclosure from a perspective of interaction between network elements. It may be understood that, to achieve the foregoing functions, each network element such as the node includes a corresponding hardware structure and/or software module for implementing each function. A person skilled in the art should easily be aware that, in combination with the algorithm operations in the examples described in the embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional module division may be performed on the node according to the foregoing method example. For example, each functional module may be obtained through division according to each corresponding function, or two or more functions may be integrated into one processing module. The integrated module may be implemented in a form of hardware, or may be implemented in a form of a software functional module. It should be noted that, in the embodiments of the present disclosure, module division is an example, and is merely logical function division. In actual implementation, there may be another division manner.

Figure 6:
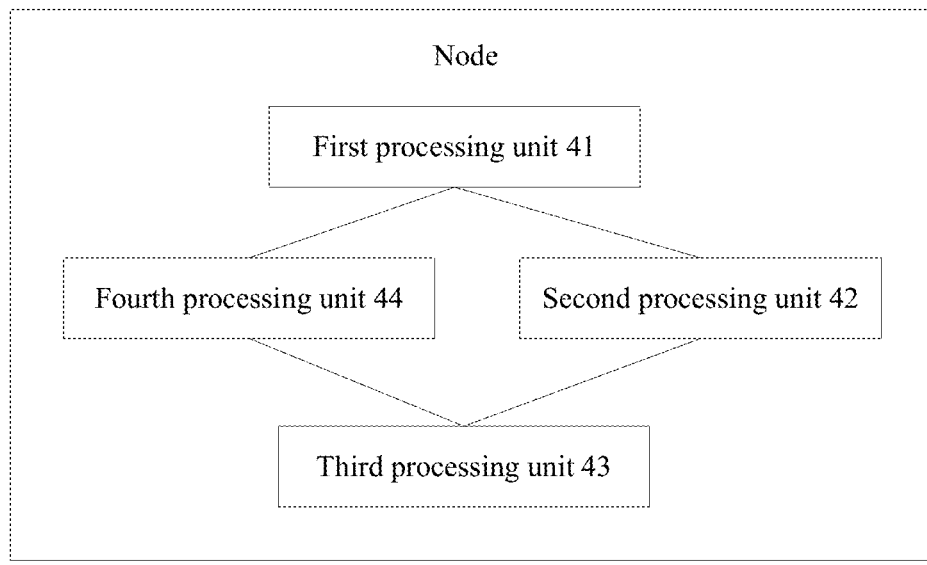
FIG. 6 is a schematic structural diagram of a node according to at least one embodiment of the present disclosure.

FIG. 6 is a schematic structural diagram of a node to at least one embodiment of the present disclosure. In some embodiments, FIG. 6 is applicable to embodiments where each functional module is obtained through division according to each corresponding function. As shown in FIG. 6, the node may include a first processor 41, a second processor 42, and a third processor 43.

The first processor 41 is configured to support the node in performing operation 301 in the transmission path determining method shown in FIG. 5.

The second processor 42 is configured to support the node in performing operation 303 in the transmission path determining method shown in FIG. 5.

The third processor 43 is configured to support the node in performing operation 304 and operation 305 in the transmission path determining method shown in FIG. 5.

In this embodiment of this application, the node may further include a fourth processor 44.

The fourth processor 44 is configured to support the node in performing operation 302 in the transmission path determining method shown in FIG. 5.

It should be noted that all related content of the operations related to the method embodiment can be incorporated into descriptions of functions of corresponding functional modules by reference. Details are not described herein again.

The node provided in this embodiment of the present disclosure is configured to perform the foregoing transmission path determining method, and therefore can achieve a same effect as the foregoing transmission path determining method.

Figure 7:
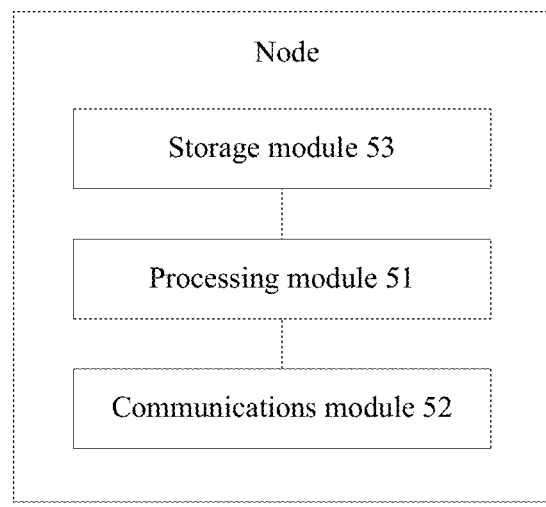
FIG. 7 is a schematic structural diagram of another node according to at least one embodiment of the present disclosure.

FIG. 7 is a schematic structural diagram of another node according to at least one embodiment of the present disclosure. In some embodiments, FIG. 7 is applicable to embodiments where an integrated unit is used. As shown in FIG. 7, the node includes a processing module 51 and a communications module 52.

The processing module 51 is configured to control and manage an action of the node. For example, the processing module 51 is configured to support the node in performing operation 301 to operation 305 in FIG. 5. The communications module 52 is configured to support communication between the node and another network entity. The node may further include a storage module 53, configured to store program code and data of the node.

The processing module 51 may be a processor or a controller. The controller/processor may implement or execute various example logical blocks, modules, and circuits described with reference to content disclosed in the present disclosure. Alternatively, the processor may be a combination implementing a computing function, for example, a combination of one or more microprocessors or a combination of a DSP and a microprocessor. The communications module 52 may be a transceiver, a transceiver circuit, a communications interface, or the like. The storage module 53 may be a memory.

When the processing module 51 is a processor, the communications module 52 is a communications interface, and the storage module 53 is a memory, the node related to this embodiment of the present disclosure may be the node shown in FIG. 4.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of the embodiments.

In addition, functional units in the embodiments of the present disclosure may be integrated into one processor, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present disclosure essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of determining a transmission path, the method comprising:
   determining, by a first node, a first candidate path group, wherein the first candidate path group comprises at least one first candidate path,
      a destination node of the at least one first candidate path is a second node, when a source node of the at least one first candidate path is the first node, and
      the destination node of the at least one first candidate path is the first node, when the source node of the at least one first candidate path is the second node;
   selecting a first path from the at least one first candidate path according to a preset first rule based on node information of each of the first candidate paths in the first candidate path group, wherein the node information comprises a node identifier (ID) and at least an ingress port number of a node connected to the at least one first candidate path or an egress port number of the node connected to the at least one first candidate path;

determining that the first path is the transmission path in response to the source node of the first path being the first node; and determining that a second path is the transmission path, in response to the source node of the first path being the second node, wherein the second path is a reverse path from the first path.

2. The method according to claim 1, wherein the determining the first candidate path group includes at least:

performing path computation by using the first node or the second node as the source node, thereby determining the first candidate path group based on a value of a node ID of the first node and a value of a node ID of the second node;

performing path computation by separately using each of the first node and the second node as the source node, determining the first candidate path group and a second candidate path group, based on the value of the node ID of the first node and the value of the node ID of the second node, wherein the second candidate path group comprises at least one second candidate path, the second candidate path uses the second node as another source node and uses the first node as another destination node, when the first candidate path uses the first node as the source node and uses the second node as the destination node, and the second candidate path uses the first node as the another source node and uses the second node as the another destination node, when the first candidate path uses the second node as the source node and uses the first node as the destination node.

3. The method according to claim 1, wherein the preset first rule includes:

comparing, for each node in the at least one first candidate path, at least values of node IDs, at least values of egress port numbers of at least two first candidate paths in the first candidate path group or at least values of ingress port numbers of at least two first candidate paths in the first candidate path group.

4. The method according to claim 1, wherein before the determining that a second path is the transmission path, the method further comprises:

reversing the first path, to obtain the second path.

5. The method according to claim 1, wherein path costs of each of the first candidate paths in the first candidate path group are the same, and the first candidate path is a path with a lowest path cost between the first node and the second node.

6. An apparatus comprising a first node, and the first node comprises:

at least one processor coupled with a memory, the memory having computer readable instructions stored thereon that when executed by the at least one processor cause the apparatus to:

determine a first candidate path group, wherein the first candidate path group comprises at least one first candidate path, a destination node of the at least one first candidate path is the second node, when the source node of the at least one first candidate path is the first node, and the destination node of the at least one first candidate path is the first node, when the source node of the at least one first candidate path is the second node;

select a first path from the at least one first candidate path according to a preset first rule based on node information of each of the first candidate paths in the first candidate path group, wherein the node information comprises a node identifier (ID) and at least an ingress port number of a node connected to the at least one first candidate path or an egress port number of the node connected to the first candidate path; and determine that the first path is the transmission path, in response to the source node of the first path is the first node; and determine that a second path is the transmission path, in response to the source node of the first path is the second node, wherein the second path is a reverse path of the first path.

7. The apparatus according to claim 6, wherein the at least one processor cause the apparatus to:

perform path computation by using the first node or the second node as the source node thereby determine the first candidate path group based on a value of a node ID of the first node and a value of a node ID of the second node; and perform path computation by separately using the first node and the second node as the source node to thereby determine the first candidate path group and a second candidate path group based on the value of the node ID of the first node and the value of the node ID of the second node, wherein the second candidate path group comprises at least one second candidate path, the second candidate path uses the second node as another source node and uses the first node as another destination node, when the first candidate path uses the first node as the source node and uses the second node as the destination node, and the second candidate path uses the first node as the another source node and uses the second node as the another destination node, when the first candidate path uses the second node as the source node and uses the first node as the destination node.

8. The apparatus according to claim 6, wherein the preset first rule includes:

comparing, for each node in the at least one first candidate path, at least values of node IDs, at least values of egress port numbers of at least two first candidate paths in the first candidate path group, or at least values of ingress port numbers of at least two first candidate paths in the first candidate path group.

9. The apparatus according to claim 6, wherein when the source node of the first path is the second node, the at least one processor is further configured to:

reverse the first path, to obtain the second path.

10. The apparatus according to claim 6, wherein path costs of each of the first candidate paths in the first candidate path group are the same, and the first candidate path is a path with a lowest path cost between the first node and the second node.

11. A non-transitory computer-readable storage medium comprising computer readable instructions stored thereon that, when executed by a processor, cause an apparatus to:

determine a first candidate path group, wherein the first candidate path group comprises at least one first candidate path,
  a destination node of the at least one first candidate path is the second node, when the source node of the first candidate path is the first node, and
  the destination node of the at least one first candidate path is the first node, when the source node of the first candidate path is the second node;
select a first path from the at least one first candidate path according to a preset first rule based on node information of each of the first candidate paths in the first candidate path group, wherein the node information comprises a node identifier (ID) and at least an ingress port number of a node connected to the at least one first candidate path or an egress port number of the node connected to the first candidate path; and
determine that the first path is the transmission path, in response to the source node of the first path is the first node; and
determine that the second path is the transmission path, in response to the source node of the first path is the second node, wherein the second path is a reverse path of the first path.

12. The non-transitory computer-readable storage medium according to claim 11, wherein the apparatus is further caused to:
  perform path computation by using the first node or the second node as the source node to thereby determine the first candidate path group based on a value of a node ID of the first node and a value of a node ID of the second node; and
  perform path computation by separately using the first node and the second node as the source node to thereby determine the first candidate path group and a second candidate path group based on the value of the node ID of the first node and the value of the node ID of the second node,
  wherein the second candidate path group comprises at least one second candidate path,
  the second candidate path uses the second node as another source node and uses the first node as another destination node, when the first candidate path uses the first node as the source node and uses the second node as the destination node, and
  the second candidate path uses the first node as the another source node and uses the second node as the another destination node, when the first candidate path uses the second node as the source node and uses the first node as the destination node.

13. The non-transitory computer-readable storage medium according to claim 11, wherein the preset first rule includes:
  comparing, for each node in the at least one first candidate path,
  at least values of node IDs,
  at least values of egress port numbers of at least two first candidate paths in the first candidate path group or
  at least values of ingress port numbers of at least two first candidate paths in the first candidate path group.

14. The non-transitory computer-readable storage medium according to claim 11, wherein the source node of the first path is the second node, the instructions executed by a computer, cause the computer to reverse the first path, to obtain the second path.

15. The non-transitory computer-readable storage medium according to claim 11, wherein path costs of each of the first candidate paths in the first candidate path group are the same, and the first candidate path is a path with a lowest path cost between the first node and the second node.

* * * * *